US 9,399,259 B2

(12) United States Patent
Chiba (10) Patent No.: US 9,399,259 B2
(45) Date of Patent: Jul. 26, 2016

(54) BORING DEVICE

(71) Applicant: KANZAKI KOKYUKOKI Mfg. Co., Ltd., Amagasaki-shi, Hyogo (JP)

(72) Inventor: Munehiko Chiba, Amagasaki (JP)

(73) Assignee: KANZAKI KOKYUKOKI MFG. CO., LTD., Hyogo (JP)

( * ) Notice: Subject to any disclaimer, the term of this patent is extended or adjusted under 35 U.S.C. 154(b) by 202 days.

(21) Appl. No.: 14/333,102

(22) Filed: Jul. 16, 2014

(65) Prior Publication Data

US 2015/0023750 A1    Jan. 22, 2015

(30) Foreign Application Priority Data

Jul. 17, 2013  (JP) .................................. 2013-148628
Jul. 23, 2013  (JP) .................................. 2013-153114

(51) Int. Cl.
*B23B 29/12* (2006.01)
*B23B 29/034* (2006.01)
*B23B 41/04* (2006.01)

(52) U.S. Cl.
CPC ........... *B23B 29/03457* (2013.01); *B23B 41/04* (2013.01); *B23B 2260/034* (2013.01); *B23B 2270/06* (2013.01); *Y10T 408/65* (2015.01); *Y10T 408/865* (2015.01)

(58) Field of Classification Search
CPC ................ B23B 41/04; B23B 2270/06; B23B 2260/034; Y10T 408/865; Y10T 408/868; Y10T 408/85; Y10T 408/85884
See application file for complete search history.

(56) References Cited

U.S. PATENT DOCUMENTS

| 3,744,924 | A | * | 7/1973 | Levosinski | ........ | B23B 29/03403 |
| | | | | | | 408/156 |
| 3,749,508 | A | * | 7/1973 | Schukrafft | ........ | B23B 29/03457 |
| | | | | | | 408/11 |
| 4,396,320 | A | * | 8/1983 | Bellmann | ............. | B23B 29/034 |
| | | | | | | 408/156 |
| 5,393,177 | A | * | 2/1995 | Cook | ................ | B23B 29/03457 |
| | | | | | | 408/13 |

FOREIGN PATENT DOCUMENTS

EP    0017967 A1 * 10/1980 ........ B23B 29/03457
JP    11-179605 A    7/1999

* cited by examiner

*Primary Examiner* — Sunil K Singh
*Assistant Examiner* — Ryan Rufo
(74) *Attorney, Agent, or Firm* — Westerman, Hattori, Daniels & Adrian, LLP (57) ABSTRACT

A boring device according to the present invention includes: a hollow main shaft; a table supporting the main shaft rotatably about a predetermined axis; a tool holder extending in the form of a bar and configured to rotate coaxially with the main shaft; a radially protruding tool provided at a distal end portion of the tool holder; a tilting unit provided between the main shaft and the tool holder in the axis direction and configured to cause the tool holder to be inclined from the axis; a drawbar configured to be movable back and forth in the axis direction within the main shaft; a first drive unit configured to rotate the main shaft about the axis; and a second drive unit configured to move the drawbar back and forth in the axis direction.

5 Claims, 9 Drawing Sheets

BORING DEVICE

TECHNICAL FIELD

The present invention relates to a boring device capable of non-circular machining.

BACKGROUND ART

Various boring devices have been proposed over the years; however, recently there is a demand for boring not only to form a usual circular hole but also to form a non-circular hole. For example, in the boring device of JP H11-179605 A, a tool that is provided at the distal end of a tool holder extending in the form of a bar is protruded in the radial direction using a piezoelectric element. Here, boring is performed to form a non-circular hole by rotating the tool holder about the axis while adjusting the protrusion length of the tool using the piezoelectric element.

SUMMARY OF INVENTION

However, the above described device suffers from various problems due to using the piezoelectric element for adjusting the protruding length of the tool. For example, lubricating oil or heat used in machining may possibly damage the piezoelectric element. Further, since the tool holder rotates at high speed, it is difficult to stably transmit control signals to the piezoelectric element, which is also a problem. As a result, there is a possibility that high-accuracy machining cannot be expected.

The present invention has been devised to solve the above described problems, and an object thereof is to provide a boring device with high operational reliability that is less likely to be affected by lubricating oil, heat, etc.

A first boring device according to the present invention includes: a hollow main shaft; a table supporting the main shaft rotatably about a predetermined axis; a tool holder extending in the form of a bar and configured to rotate coaxially with the main shaft; a radially protruding tool provided at a distal end portion of the tool holder; a tilting unit provided between the main shaft and the tool holder in the axis direction and configured to cause the tool holder to be inclined from the axis; a drawbar configured to be movable back and forth in the axis direction within the main shaft; a first drive unit configured to rotate the main shaft about the axis; and a second drive unit configured to move the drawbar back and forth in the axis direction. The tilting unit includes: a coupling member coupled to the drawbar, the coupling member having a fixing portion provided at a position away from the axis in the radial direction and a first abutting surface facing the main shaft side; a mounting base arranged between the coupling member and the main shaft so as to be fixed to the main shaft, the mounting base having a second abutting surface that is opposed to the first abutting surface of the coupling member via a gap of a predetermined length in the axis direction; and a tilting member coupled to the fixing portion of the coupling member, the tilting member having a deformable portion that is elastically deformable toward a side opposite to the fixing portion with respect to the axis, the tilting member being fixed to the mounting base at a position on an outer side of the deformable portion in the radial direction, and the tilting member supporting the tool holder, wherein the tilting member is configured to be inclined toward the main shaft side by deformation of the deformable portion.

According to this configuration, when the drawbar is moved in the axis direction so that the tilting member of the tilting unit is drawn toward the main shaft side, the deformable portion is elastically deformed to be inclined. Thus, the tool holder coupled to the tilting member can be inclined from the axis. On the other hand, when the drawing force applied to the drawbar is released, the deformable portion recovers its original shape due to elasticity. Accordingly, the tilting member also returns to its original position, thereby allowing the tool holder to recover its position extending along the axis. Such inclination of the tool holder allows the tool to move in the radial direction. Therefore, boring to form a non-circular hole is made possible. As described above, in the present invention, the tool is mechanically moved in the radial direction by a drawing force of the drawbar. Therefore, as compared to the case in which the tool is moved using a piezoelectric element as in the conventional art, it is possible to suppress the influence of lubricating oil or heat on the machining operation, thereby enhancing the operational reliability. As a result, it is possible to improve the machining accuracy.

Further, for example, when the drawbar undergoes thermal deformation, it is possible to reset the positional relationship between the coupling member and the mounting base by drawing the drawbar so that the first abutting surface of the coupling member and the second abutting surface of the mounting base abut each other. Thereafter, the gap between the two abutting surfaces is set to a predetermined distance by the second drive unit. By performing such an operation each time before machining, it is possible to perform machining under the same positional relationship at any time, even if thermal deformation occurs. Accordingly, the positional relationship between members can be easily reset even if thermal deformation occurs, and therefore the machining accuracy can be improved.

In the above described boring device, when the tilting member is drawn by the coupling member, the tilting member is inclined. Therefore, the tilting member is inclined also with respect to the coupling member. At this time, the inclination of the tilting member with respect to the coupling member can be absorbed by coupling the fixing portion of the coupling member and the tilting member using an elastic member configured to deflect in the radial direction. As a result, it is possible to transmit the drawing force of the coupling member smoothly to the tilting member.

The above described boring device may have a configuration in which the coupling member includes: a base coupled to the drawbar; and a first extending portion extending toward the tool holder side while being inclined outwardly in the radial direction from the base, the first extending portion having the fixing portion. In such a configuration, the first extending portion is inclined with respect to the axis, and therefore the drawing force with which the coupling member draws the tilting member can be transmitted effectively to the tilting member.

Here, the coupling member may be configured to further include a second extending portion extending toward the tool holder side while being inclined in the radial direction toward a side opposite to the first extending portion, the second extending portion having the first abutting surface. In this way, when the second extending portion that is not coupled to the tilting member is provided and the first abutting surface is provided therein, the second extending portion is not subjected to forces following the drawing force and thus is not deformed, which allows the first abutting surface and the second abutting surface to accurately abut each other. Thus, it is possible to accurately reset the positional relationship as described above.

The above described boring device may have a configuration in which the second drive unit is composed of a linear actuator, for example.

The first boring device according to the present invention is less likely to be affected by lubricating oil, heat, etc., and its operational reliability can be improved.

Further, in order to deal with the aforementioned problem in JP H11-179605 A, there has been demand for means for correcting thermal deformation when it occurs. Such a problem commonly occurs not only in boring devices of a type using a piezoelectric element for adjusting the protruding length of a tool, but also in boring devices in which it is possible that a tool holder provided with a tool protruding therefrom is deviated from its original position due to thermal deformation during boring using the tool holder.

A second boring device according to the present invention has been devised to solve the above described problems, and an object thereof is to provide a boring device capable of easily sensing the deviation of a tool holder from its original position, for example, due to thermal deformation, and correcting it.

The second boring device according to the present invention includes:

a hollow main shaft;

a table supporting the main shaft rotatably about a predetermined axis;

a tool holder having a spindle in a bar shape extending along the axis, the tool holder being configured to rotate coaxially with the main shaft;

a radially protruding tool provided at a distal end portion of the spindle of the tool holder;

a tilting unit provided between the main shaft and the tool holder in the axis direction and configured to cause the spindle of the tool holder to be inclined from the axis;

a drawbar configured to be movable back and forth in the axis direction within the main shaft;

a first drive unit configured to rotate the main shaft about the axis;

a second drive unit configured to move the drawbar back and forth in the axis direction; and a detection unit configured to detect inclination of the spindle.

The detection unit includes:

a sensing unit supported so as to be movable close to and away from the outer circumferential surface of the spindle in the radial direction;

a third drive unit configured to move the sensing unit close to and away from the spindle;

a calculation unit configured to calculate inclination of the spindle from the axis on the basis of positional information of the sensing unit relative to the outer circumferential surface of the spindle when the spindle is rotated at a predetermined angle by the first drive unit; and a drive control unit configured to control the third drive unit and configured to control the second drive unit so as to correct inclination of the spindle on the basis of the inclination calculated by the calculation unit.

According to this configuration, the inclination of the spindle with respect to the axis is detected on the basis of the positional information of the sensing unit relative to the outer circumferential surface of the spindle when the spindle of the tool holder is rotated at a predetermined angle. Therefore, for example, even if the drawbar, etc., is deformed due to heat, thereby inclining the spindle from the axis, such inclination can be easily detected. Further, since the positional information of the sensing unit relative to the outer circumferential surface of the spindle is detected, the degree of inclination with respect to the axis can be easily calculated. Therefore, the inclination of the spindle can be easily corrected by driving the drawbar on the basis of the calculated degree of inclination.

In the above described boring device, the inclination of the spindle can be sensed using various methods. For example, the following method can be employed. That is, the method may be such that: the tilting unit is configured to cause the spindle of the tool holder to be inclined in only one direction; the sensing unit of the tilting unit is attached to a side toward which the spindle is inclined from its original position; the drive control unit controls the first and third drive units so that, after the positional information of the sensing unit relative to a first point on the outer circumferential surface of the spindle is acquired, the spindle is rotated 180 degrees, and the positional information of the sensing unit relative to a second point located on a side that is opposite to the first point with the center of the spindle interposed therebetween is acquired; and the calculation unit calculates the inclination of the spindle on the basis of the difference between the positional information of the sensing unit relative to the first point and the positional information of the sensing unit relative to the second point.

Thereby, it is determined that the spindle is inclined when these two pieces of the positional information do not match each other. Further, since the degree of inclination of the spindle is known based on the difference between the two pieces of the positional information, it is possible to correct the inclination easily.

The above described boring device may have a configuration in which the sensing unit acquires the positional information by being driven to abut the spindle by the third drive unit. That is, the position at which the sensing unit abuts the outer circumferential surface of the spindle can be used as the positional information. It should be noted that the sensing unit may be a non-contact sensor. In this case, after the sensing unit is moved close to the spindle, the distance between the sensing unit and the spindle is measured, the result of which is used as the positional information.

The above described boring device may have a configuration in which the third drive unit includes a fourth drive unit and a fifth drive unit. Further, it is possible to employ a configuration in which: the detection unit includes a first base and a second base configured to be movably supported on the first base and configured to movably support the abutting portion; the fourth drive unit moves the second base close to and away from the spindle on the first base; and the fifth drive unit moves the abutting portion close to and away from the spindle on the second base.

Such a configuration can move the sensing unit close to and away from the spindle in two steps. For example, the sensing unit can be moved close to the spindle by the fourth drive unit, and thereafter the sensing unit can be further moved closer to the spindle by the fifth drive unit. Alternatively, the sensing unit may be abutted against the spindle by the fifth drive unit. This is advantageous, for example, when the abutting portion is moved close to two points of the spindle by rotating the spindle as described above. That is, in order to rotate the spindle after the abutting portion is moved close to the spindle by the fourth and fifth drive units, the sensing unit is required to be moved temporarily away from the spindle. At this time, when only the fifth drive unit is driven, the sensing unit returns to a position between the initial position and the spindle without moving back to the initial position, and thus it is possible to shorten the time to move the sensing unit. As a result, the process for detecting the inclination of the spindle can be efficiently performed.

As described above, the second boring device according to the present invention enables easy detection and correction of displacement of the tool holder from its original position due to thermal deformation, etc.

REFERENCE SIGNS LIST

1: Tool Holder
11: Tool
12: Spindle
2: Main Shaft
22: Main Shaft Motor (First Drive Unit)
30: Detection Unit
32: First Base
33: First Air Cylinder (Fourth Drive Unit)
35: Second Base
36: Sensing Unit
37: Second Air Cylinder (Fifth Drive Unit)
4: Tilting Unit
41: Mounting Base
42: Coupling Member
422: First Extending Portion
423: Second Extending Portion
44: Tilting Plate (Tilting Member)
447: Thin Portion (Deformable Portion)
45: Elastic Plate (Elastic Member)
7: Drawbar
8: Drive Unit (Second Drive Unit)

DESCRIPTION OF EMBODIMENTS

First Embodiment

Figure 1:
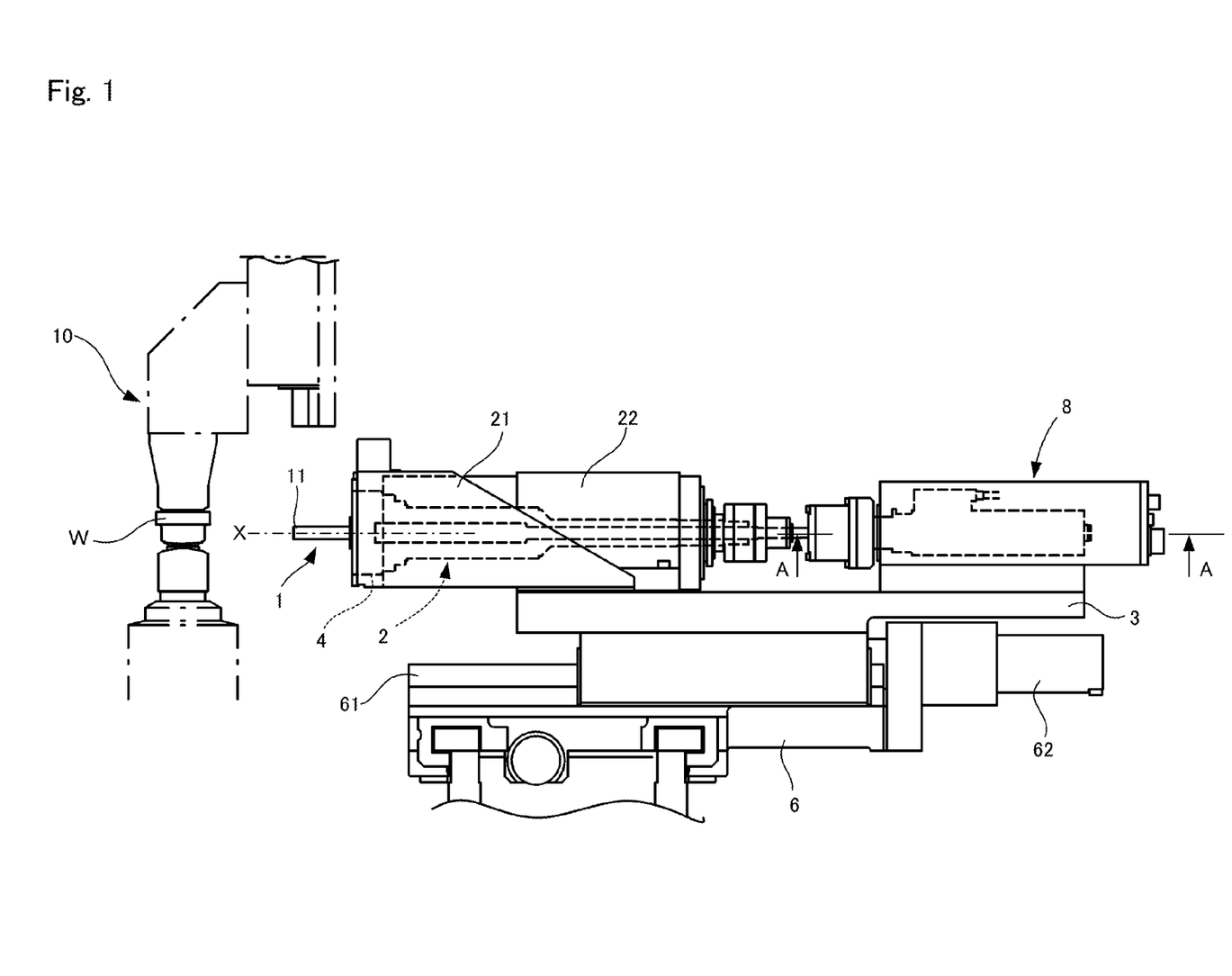
FIG. 1 is a side view of a boring device according to a first embodiment of the present invention.
Figure 2:
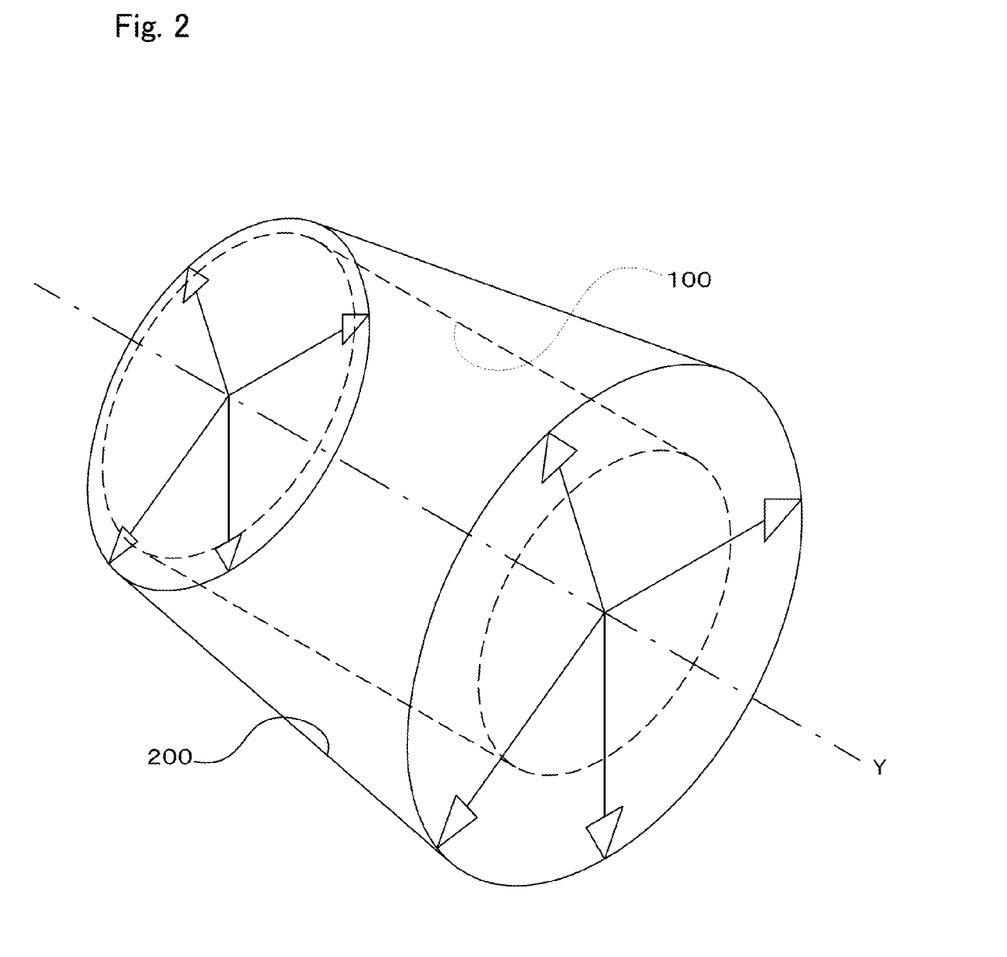
FIG. 2 is a perspective view showing the shape of a hole that can be formed by the boring device in FIG. 1.

Hereinafter, a first embodiment of a boring device according to the present invention will be described with reference to the drawings. FIG. 1 is a side view of the boring device according to this embodiment. FIG. 2 is a perspective view showing the shape of a hole that can be formed by the boring device. Hereinafter, for convenience of description, descriptions of other figures as well will be given with reference to FIG. 1, in which the left side in this figure is referred to as "front" or "distal" side, the right side is referred to as "rear", and the upward and downward directions are referred to as "upper and lower" sides. Further, the "rear" surface may be referred to also as back surface. However, the directions of members used in the present invention are not limited thereto.

In this embodiment, an engine piston is assumed to be a workpiece W subjected to machining as an example, and a boring device for machining a pin hole in this piston is described. As shown in FIG. 1, the boring device according to this embodiment includes a tool holder 1 extending in the form of a bar and a main shaft 2 configured to rotate the tool holder 1 about the axis, and these are arranged on a table 3. An axis X of the tool holder 1 almost coincides with the center axis Y of a pilot hole (see FIG. 2) provided in advance in the pin hole of the workpiece W. A tool 11 protruding in the axis direction is detachably attached to the distal end of the tool holder 1, and the displacement in the radial direction of the tool 11 is controlled by a control program, thereby machining the inner wall of the pilot hole into a desired shape. In this embodiment, as shown in FIG. 2, a pin hole 200 having a cross section of a non-circular trumpet shape is produced by machining the inner wall of a pilot hole 100.

The main shaft 2 is rotatably accommodated within a housing 21 arranged on the table. A main shaft motor (first drive unit) 22 is arranged at the rear end of the housing 21, and the main shaft 2 is driven so as to rotate about the axis by the main shaft motor 22. The aforementioned tool holder 1 is attached to the front end of the main shaft 2 via a tilting unit 4, which will be described below. On the other hand, a drive unit 8 (second drive unit) for manipulating the tool holder 1 in the radial direction is arranged at the rear end of the main shaft 2, and is arranged on the table 3 together with the housing 21. Further, the table 3 is arranged on a base 6 via a rail 61 so as to be movable forward and backward relative to the base 6. Further, a slide motor 62 for moving the table 3 forward and backward is arranged at the rear end of the base 6. This allows the tool holder 1 on the table 3 to move close to and away from the workpiece W.

Figure 3:
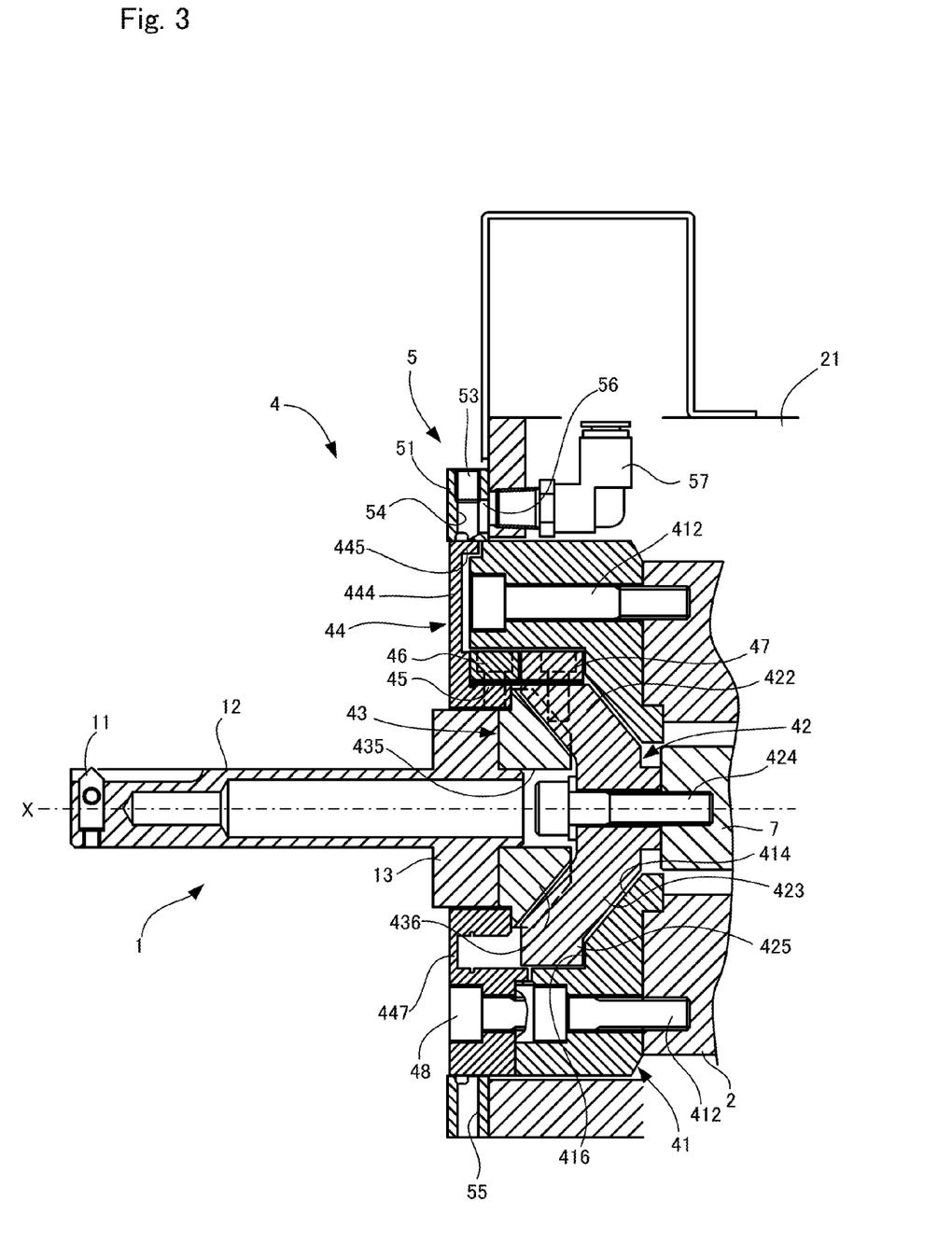
FIG. 3 is a sectional view in the vicinity of the front end of a main shaft.
Figure 4:
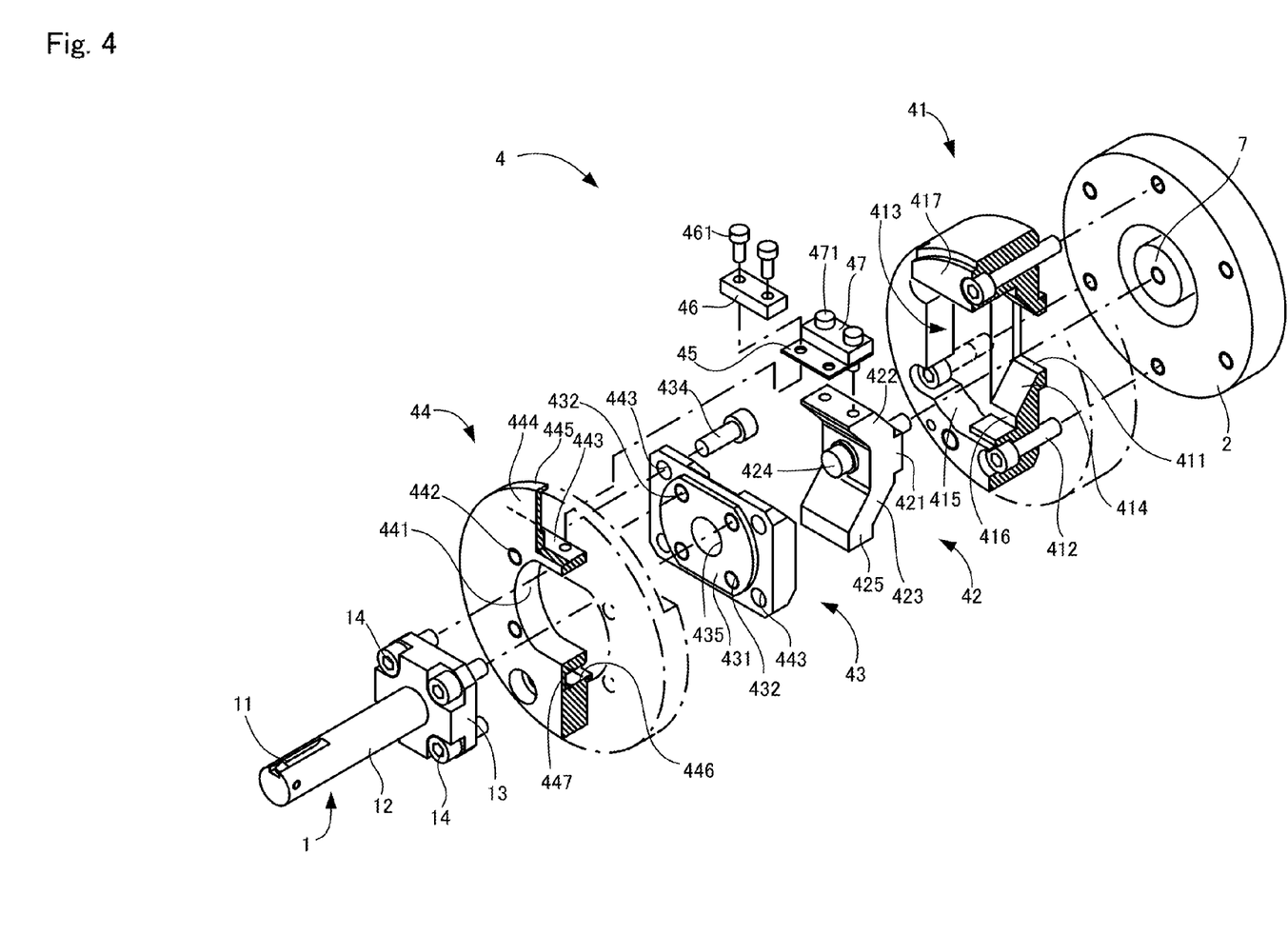
FIG. 4 is an exploded perspective view of a tilting unit.
Figure 5:
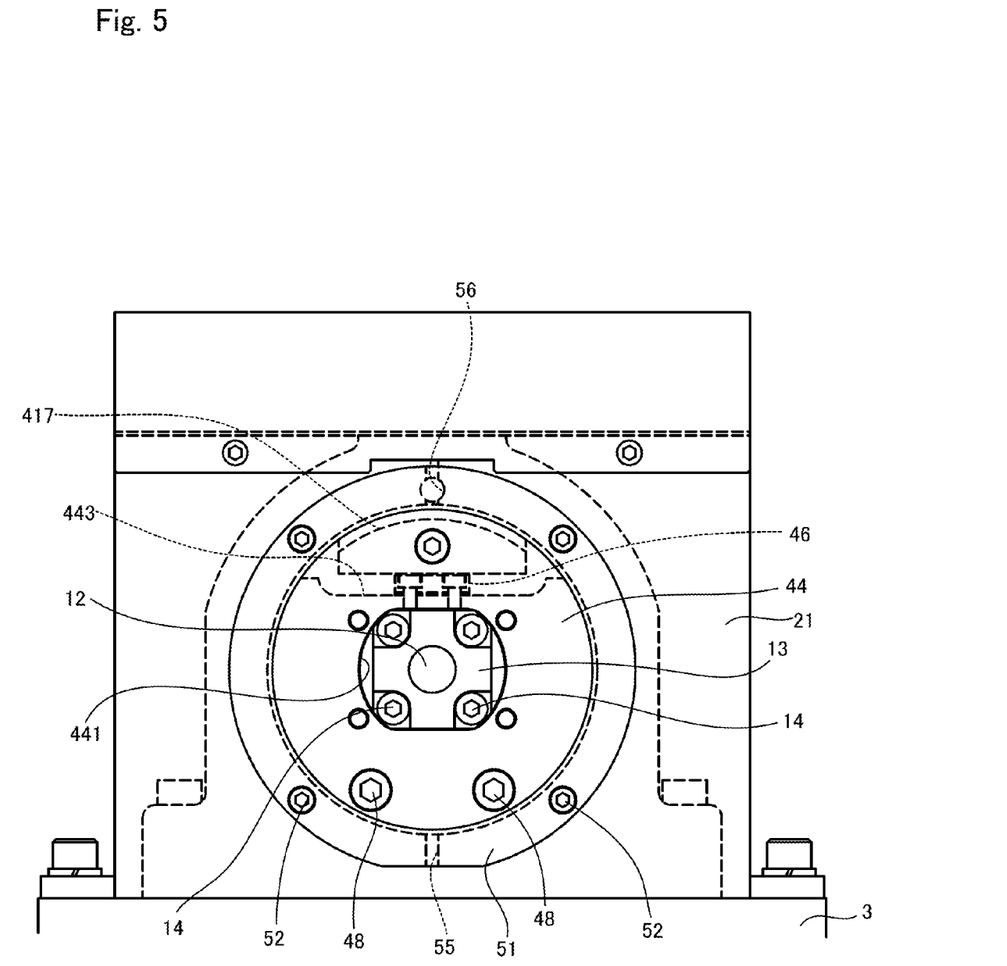
FIG. 5 is a front view of FIG. 1.

Next, the configuration on the front side of the main shaft 2 will be described with reference also to FIG. 3 to FIG. 5. FIG. 3 is a sectional view in the vicinity of the front end of the main shaft. FIG. 4 is an exploded perspective view of the tilting unit. FIG. 5 is a front view of FIG. 3.

As shown in FIG. 3 and FIG. 4, the tool holder 1 is attached to the front end of the main shaft 2 via the tilting unit 4. The tool holder 1 is composed of a spindle 12 to which the tool 11 is attached, and a supporting portion 13 that supports the spindle 12. The spindle 12 is formed into a cylindrical shape, and the tool 11 protruding outwardly in the radial direction is attached to the outer circumferential surface of the distal end portion of the spindle 12. The supporting portion 13 is formed into a rectangular shape in front view. The spindle 12 protrudes from the center of the supporting portion 13, and through holes into which bolts 14 are inserted are formed at the four corners thereof.

The main shaft 2 is formed to be a hollow shape, into which a drawbar 7 that is movable back and forth in the axis direction is inserted. The distal end of the drawbar 7 is arranged at a position slightly inside in the axis direction relative to the distal end surface of the main shaft 2, and is connected to the tilting unit 4. On the other hand, the rear end of the drawbar 7 is connected to the drive unit 8, as described below, and the drawbar 7 can be moved forward and backward by the drive unit 8.

Subsequently, the tilting unit 4 arranged between the main shaft 2 and the tool holder 1 will be described. As shown in FIG. 3 and FIG. 4, the tilting unit 4 is mainly composed of a mounting base 41, a coupling member 42, a tool mounting plate 43, and a tilting plate 44, which are assembled in a line in this order from the main shaft 2 side toward the tool holder 1. Hereinafter, descriptions will be given in order. The mounting base 41 is in the form of a circular plate. The distal end portion of the drawbar 7 is exposed through a rectangular center hole 411 formed at the center of the mounting base 41. The mounting base 41 is fixed to the distal end surface of the main shaft 2 by bolts 412 at six points along its peripheral edge. Further, an accommodating recess 413 in which the later-described coupling member 42, the tool mounting plate 43, and the like are accommodated is formed on the distal end surface of the mounting base 41.

The accommodating recess 413 is formed by a first recessed portion 414 and a second recessed portion 415, which are lined up from the rear end side toward the front end side, communicating with each other. The first recessed portion 414 is formed into a trapezoid shape in side view, having inclined surfaces which are inclined toward the front side, upward and downward respectively from the upper edge side and the lower edge side of the center hole 411. The coupling member 42, which will be described below, is partially accommodated therein. The second recessed portion 415 is formed continuously from the front side of the first recessed portion 414, having an approximately rectangular shape in front view. The tool mounting plate 43, which will be described below, is partially accommodated therein. Further, the second recessed portion 415 is formed so as to surround the first recessed portion 414, and has a stepped surface 416 extending in the radial direction so as to be continuous with the inner wall of the first recessed portion 414.

Further, a projecting portion 417 extending along the upper edge of the aforementioned second recessed portion 415 is formed in an upper end portion of the mounting base 41. The projecting portion 417 is formed so as to have a lower surface extending continuously from the upper edge of the second recessed portion 415 and an upper surface extending along the circular outer circumferential surface of the mounting base 41.

Next, the coupling member 42 will be described. The coupling member 42 includes a cuboid base 421 configured to be coupled to the drawbar 7. A first extending portion 422 and a second extending portion 423 extending to be inclined upwardly and downwardly are integrally coupled, respectively, to the upper part and the lower part of the base 421. The coupling member 42 as a whole is Y-shaped in side view. A through hole is formed in the base 421, and a bolt 424 inserted through the through hole is fixed to the distal end of the drawbar 7. Thus, the drawbar 7 and the coupling member 42 are integrally fixed to each other, and the coupling member 42 is configured to move back and forth together with the drawbar 7.

The upper end surface (fixing portion) of the first extending portion 422 of the coupling member 42 is formed into a flat rectangular shape extending in the axis direction. Elastic plates 45, which will be described below, are arranged on this upper end surface. On the other hand, a stopper portion 425 formed into a rectangular cuboid shape is formed in a lower end portion of the second extending portion 423. The coupling member 42 formed as above is fitted into the accommodating recess 413 of the mounting base 41 via a slight gap. That is, the back surface of the first extending portion 422 is opposed to the upper inclined surface of the first recessed portion 414 of the mounting base 41. On the other hand, the back surface of the second extending portion 423 is opposed to the lower inclined surface of the first recessed portion 414 of the mounting base 41. Further, the back surface (first abutting surface) of the stopper portion 425 of the second extending portion 423 is opposed to the stepped surface (second abutting surface) 416 of the second recessed portion 415 via a gap.

Next, the coupling structure of the tool holder 1, the tilting plate 44, and the tool mounting plate 43 will be described. First, the tilting plate 44 will be described. The tilting plate 44 is in the form of a circular plate having almost the same outer diameter as the mounting base 41, and has a flat surface on its distal end side. At its center, a rectangular center hole 441 is formed therethrough. The supporting portion 13 of the tool holder 1 is inserted into the center hole 441 from the distal end side. Further, four through holes 442 are formed in the peripheral edge of the center hole 441. A step portion 443 is formed on the back surface of the tilting plate 44 along the upper surface of the center hole 441. The tilting plate 44 is formed to have a smaller thickness in portions above the step portion 443 than in other portions. That is, an arcuate thin plate portion 444 is formed above the center hole 441 in the tilting plate 44. A projecting edge 445 projecting backward is formed on the peripheral edge of the thin plate portion 444. The projecting edge 445 is arranged along the projecting portion 417 of the mounting base 41. Further, two fixing holes are formed in the step portion 443.

On the other hand, a groove 446 linearly extending along the lower side of the center hole 441 to the peripheral edge of the tilting plate 44 is formed below the center hole 441 in the tilting plate 44. The portion where the groove 446 is formed forms a thin portion (deformable portion) 447 having a smaller material thickness as compared to other portions.

Next, the tool mounting plate 43 is described. The tool mounting plate 43 is formed into a rectangular shape in front view. On the distal end surface of the tool mounting plate 43, a projecting surface 431 is formed in a rectangular shape that is fitted into the center hole 441 of the tilting plate 44. Through holes 432 are formed at the four corners of the projecting surface 431. The through holes 432 coincide with the through holes of the supporting portion 13 of the tool holder 1 so that the tool mounting plate 43 is fixed by bolts 14. That is, the supporting portion 13 of the tool holder 1 is inserted into the center hole 441 of the tilting plate 44 from the distal end side, and the projecting surface 431 of the tool mounting plate is inserted thereinto from the rear end side. They are fixed by the bolts 14 within the center hole 441. Further, four through holes 433 are formed in the periphery of the projecting surface 431 on the distal end surface of the tool mounting plate 43. The through holes 433 coincide with the through holes 442 of the tilting plate 44, and they are fixed by bolts 434. Thus, the tilting plate 44 and the tool mounting plate 43 are fixed to each other.

Further, as shown in FIG. 3, a through hole 435 is formed at the center of the tool mounting plate 43, and inclined surfaces 436 respectively extending upward and downward from the through hole 435 are formed on the back surface of the tool mounting plate 43. The inclined surfaces 436 extend so as to be opposed to the inclined surfaces on the distal end side of the first extending portion 422 and the second extending portion 423 of the coupling member 42. Further, the head of the bolt 424 fixing the coupling member 42 and the drawbar 7 to each other is accommodated from the back side in the through hole 435.

Next, the coupling structure of the tilting plate 44 and the coupling member 42 will be described. The top of the first extending portion 422 of the coupling member 42 and the step portion 443 of the tilting plate 44 are coupled to each other by a plurality of elastic plates 45 composed of a leaf spring. The plurality of elastic plates 45 are layered, and have distal end portions arranged on the step portion 443 of the tilting plate 44. Above that, a first fixing piece 46 having a cuboid shape is arranged, and is fixed by bolts 461. That is, the bolts 461 are screwed into the step portion 443 of the tilting plate 44, passing through the first fixing piece 46 and the elastic plates 45. On the other hand, the rear end portions of the elastic plates 45 are arranged on the top of the first extending portion 422, and a second fixing piece 47 having a cuboid shape is arranged further thereon, which are fixed by bolts 471. That is, the bolts 471 are screwed into the top of the first extending portion 422, passing through the second fixing piece 47 and the elastic plates 45. The first and second fixing pieces 46 and 47 are arranged around the upper end of the second recessed portion 415 of the mounting base 41, that is, below the projecting portion 417.

Further, as shown in FIG. 3, the lower end portion of the tilting plate 44 and the lower end portion of the mounting base 41 are fixed by a bolt 48. More specifically, a through hole is formed below the thin portion 447 of the tilting plate 44, and the bolt 48 inserted through the through hole is screwed into a lower end portion of the mounting base 41, that is, a portion below the accommodating recess 413.

In the tilting unit 4 configured as above, the tool holder 1, the tilting plate 44, and the tool mounting plate 43 are integrally fixed by the bolts 14 and 434. The tilting plate 44 and the coupling member 42 are fixed to each other via the elastic plates 45. The lower end portion of the tilting plate 44 is fixed to the mounting base 41. However, the tilting plate 44 is configured to be inclined backward when the tilting plate 44 is drawn backward, because the thin portion 447 is formed in the lower end portion of the tilting plate 44 and the thin portion 447 deflects due to elastic deformation. Further, since the elastic plates 45 coupling the tilting plate 44 and the coupling member 42 extend in the horizontal direction, the elastic plates 45 elastically deform so as to deflect upward and downward. Accordingly, the tilting plate 44 is configured to be inclined with respect to the coupling member 42. With the configuration as described above, when the coupling member 42 is drawn backward by the drawbar 7, the tilting plate 44 coupled to the coupling member 42 deflects at the thin portion 447, so that portions above the thin portion 447 are inclined backward. Accordingly, the tool holder 1 is swung upward. At this time, the upper part of the tilting plate 44 is inclined backward by the drawing, and therefore the elastic plates 45 deflect upward so as to absorb the inclination. Accordingly, the tilting plate 44 is smoothly inclined also by a linear motion of the drawbar 7.

It should be noted that the tilting plate 44 that constitutes the tilting unit 4 is made of metal and has the thin portion 447 with a reduced thickness, thereby being elastically deformable in response to a slight application of force. As described above, the drawbar 7 is drawn to the back side, and the tilting plate 44 is inclined backward due to deformation of the thin portion. However, when the force drawing the drawbar 7 is removed, the tilting plate 44 returns to its original shape by an elastic force. Accordingly, the tilting plate 44 is inclined within the elastic deformation range of the metal of which the tilting plate 44 is made.

Further, the mounting base 41 and the tilting plate 44 are coupled to the main shaft 2, and the tool holder 1 and the coupling member 42 are coupled to the tilting plate 44. Therefore, when the main shaft 2 rotates, the tilting unit 4 is rotated together with the tool holder 1.

Subsequently, the airing mechanism of the aforementioned tilting unit 4 will be described. As shown in FIG. 3, the upper part of the tilting plate 44 is inclined, and therefore a gap is formed between the tilting plate 44 and the mounting base 41 which is opposed thereto. However, if foreign matter is trapped in this gap, the inclination of the tilting plate 44 may be prevented by this in some cases. Therefore, an airing mechanism 5 is provided in the periphery of the tilting unit 4 so that foreign matter is not trapped in the gap between the tilting plate 44 and the mounting base 41. As shown in FIG. 3 and FIG. 5, a ring member 51 in the form of a plate is fixed to the distal end portion of the housing 21 by bolts 52. The ring member 51 is arranged at almost the same position as the tilting plate 44. A projecting portion 53 in the form of a ring extending toward the housing 21 side is formed on the outer circumferential surface of the ring member 51 so as to abut the distal end surface of the housing 21. Thus, an airing space 54 in the form of a ring whose outer circumference is closed by the projecting portion 53 is formed between the ring member 51 and the distal end surface of the housing 21.

In a lower portion of the ring member 51, a through hole is formed in the projecting portion 53. The through hole serving as an exhaust port 55 allows communication between the airing space 54 and the outside. On the other hand, an intake port 56 is formed on the distal end surface of the housing 21 that corresponds to an upper portion of the ring member 51. An air intake pipe 57 is arranged inside the housing 21, and the air supplied from the intake pipe 57 is supplied to the airing space 54 through the intake port 56. Such air serves as an air wall surrounding the periphery of the tilting plate 44, and covers the gap between the tilting plate 44 and the mounting base 41. This prevents foreign matter from entering this gap. It should be noted that the air in the airing space 54 is supplied through the intake port 56 and discharged through the exhaust port 55.

Figure 6:
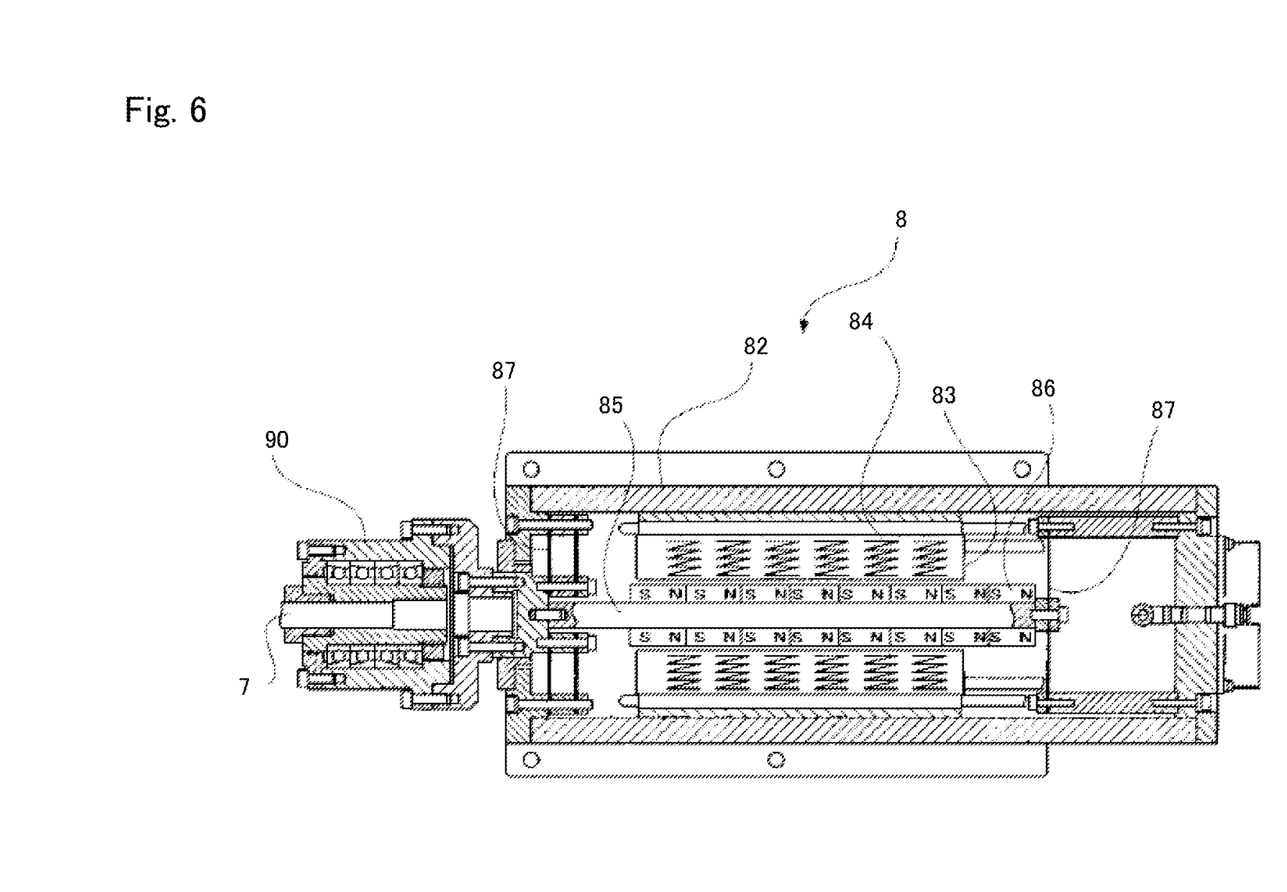
FIG. 6 is a sectional view taken along the line A-A in FIG. 2.

Next, the drive unit 8 that drives the drawbar 7 will be described with reference to FIG. 6. FIG. 6 is a sectional view taken along the line A-A in FIG. 1. As shown in FIG. 1 and FIG. 6, the drive unit 8 of this embodiment is composed of a known linear actuator. Specifically, the drive unit 8 includes a body case 82 arranged so as to extend in the horizontal direction on the table 3. A slider 85 in the form of a plate extending forward and backward and a support member 87 supporting the front end portion and the rear end portion of the slider 85 are arranged inside the body case 82. Thus, the slider 85 is configured to be movable back and forth along the direction of the axis X within the body case 82. A plurality of magnets 86 are attached to both the left and right surfaces of the slider 85, and a pair of coil cases 83 are arranged respectively on the left and right sides of the slider 85 so as to be opposed to the magnets 86. A plurality of coils 84 are arranged inside each of the coil cases 83.

A bearing 90 is fixed to the front end portion of the slider 85, and the rear end portion of the drawbar 7 is rotatably fixed to the bearing 90. This allows the back-and-forth motion of the slider 85 to be transmitted to the drawbar 7 via the bearing 90.

According to the drive unit 8 configured as above, when the coils 84 are energized, the slider 85 moves in the direction of the axis X relative to the body case 82 by the interaction between the energized coils 84 and the magnets 86. Then, the back-and-forth motion of the slider 85 is transmitted to the drawbar 7 via the bearing 90. The amount of movement of the slider 85 can be appropriately adjusted by controlling the degree of energization of the coils 84 using a controller, which is not shown. Further, the moving direction of the slider 85 can be changed by changing the energizing direction (current direction) of the coils 84. It should be noted that the controller performs general control of the boring device of this embodiment, such as control of the rotational driving of the main shaft, a slide motor, etc., other than the drive unit 8.

Subsequently, operation of the boring device configured as above will be described. First, as shown in FIG. 1, the workpiece W subjected to machining is fixed to a workpiece holding unit 10. Next, the center axis Y of the pilot hole 100 of the workpiece W is made to coincide with the axis X of the tool holder 1, and thereafter a slide motor 62 is driven to move the tool holder 1 close to the workpiece W. Subsequently to this, the main shaft motor is driven, and the tool holder 1 is inserted into the pilot hole 100 while the tool holder 1 is rotated about the axis. Then, the linear actuator is driven under control according to a pre-set control program in the controller, so that the tool holder 1 is inclined from the axis X. Thus, a hole having a non-circular cross section, as shown in FIG. 2, can be formed by moving the tool 11 in the axis direction while changing its position in the radial direction during the time when the tool 11 makes one revolution. The distance through which the tool 11 is moved in the radial direction can be set to 0.1 to 0.2 mm, for example.

Meanwhile, heat generated during boring may transfer from the tool 11 to the drawbar 7 through the tool holder 1, or heat of the main shaft motor 22 may transfer to the drawbar 7, in some cases. Then, the drawbar 7 may possibly be thermally deformed by receiving such heat, thereby causing a loss of the original position of the tool 11, which may result in a decrease in machining accuracy. For preventing this, the following operation may be performed.

After the machining of a first workpiece W is completed and before the machining of the next workpiece W is started, or after the machining of some workpieces W is completed, the drive unit 8 is driven, in the state where the driving of the main shaft motor 22 is stopped, so as to draw the drawbar 7 toward the rear end side. This causes the coupling member 42 to be drawn. The drawbar 7 draws the coupling member 42 until the back surface of the stopper portion 425 of the coupling member 42 abuts the stepped surface 416 of the second recessed portion 415 of the mounting base 41. Thus, the tool 11 is intentionally inclined and the position at which the back surface of the stopper portion 425 abuts the stepped surface 416 is set to zero (reference point). From this position, the drawbar 7 is moved forward until the axis of the tool 11 coincides with the axis of the main shaft 2, that is, until the stopper portion 425 and the stepped surface 416 forms a gap of a predetermined distance.

As described above, a gap of a predetermined distance is provided in advance between the coupling member 42 and the mounting base 41, which allows the drawbar 7 to draw the coupling member 42 by the distance of the gap at maximum. However, thermal deformation of the drawbar 7 may possibly change the distance of the gap. Therefore, the stopper portion 425 and the stepped surface 416 are allowed to abut each other one time, as described above, thereby resetting the positional relationship of the two, from which they are moved away from each other by a predetermined distance. Therefore, even when the distance between the stopper portion 425 and the stepped surface 416 is changed due to thermal deformation, the distance can be easily adjusted to a non-eccentric state of the tool 11 before machining a workpiece W without fail. As a result, it is possible to enhance the operational reliability and to improve the machining accuracy. Whether or not the tool 11 (stopper portion 425) has reached a predetermined target position is determined using an encoder (not shown) in the drive unit 8.

Second Embodiment

Figure 7:
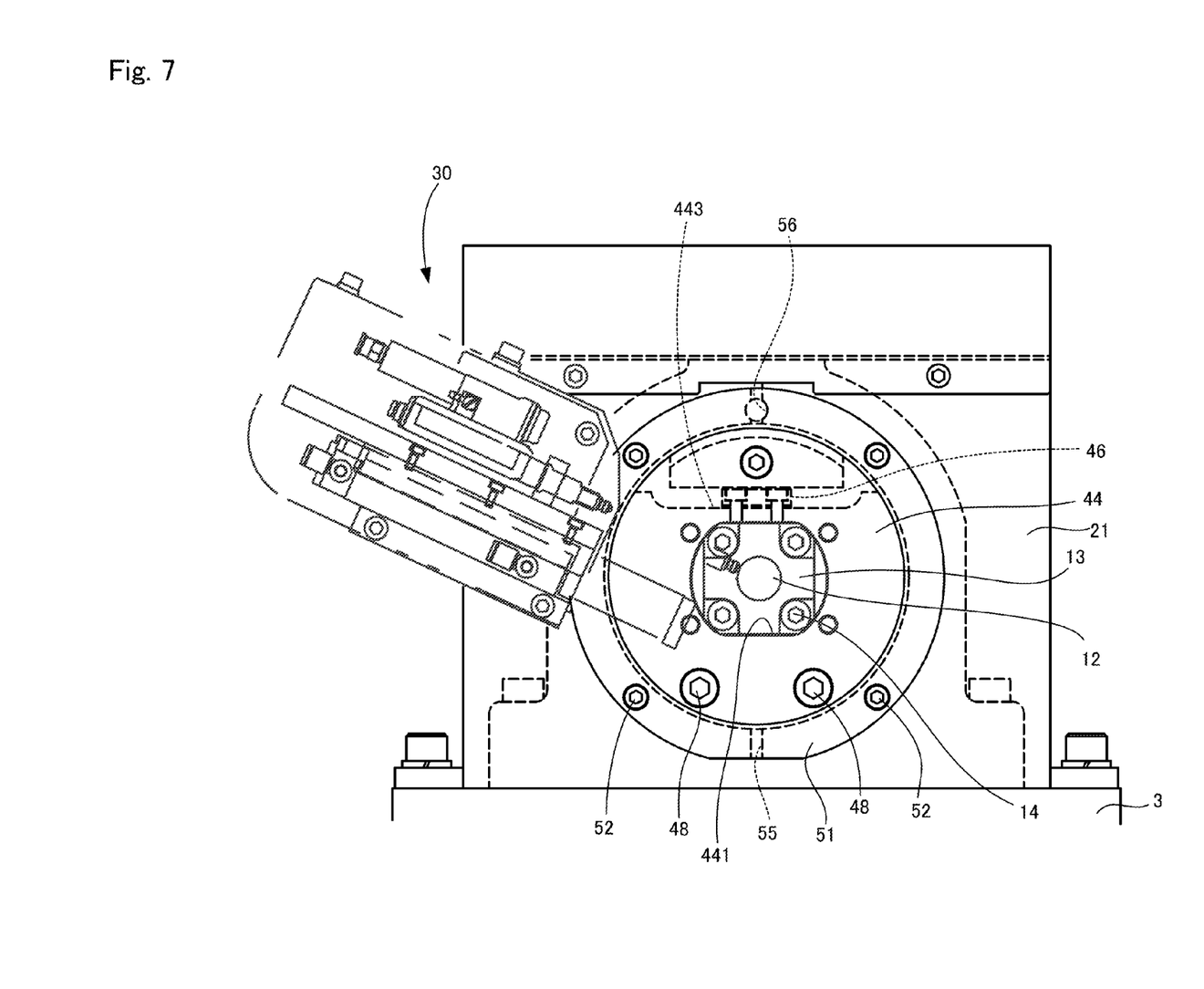
FIG. 7 is a front view of a boring device according to a second embodiment of the present invention.

Next, a second embodiment of the boring device according to the present invention will be described. The boring device according to the second embodiment is different from the boring device according to the first embodiment in that a detection unit 30 configured to detect a displacement of the tool holder 1 is provided at the distal end of the housing 21, as shown in FIG. 7.

Figure 8:
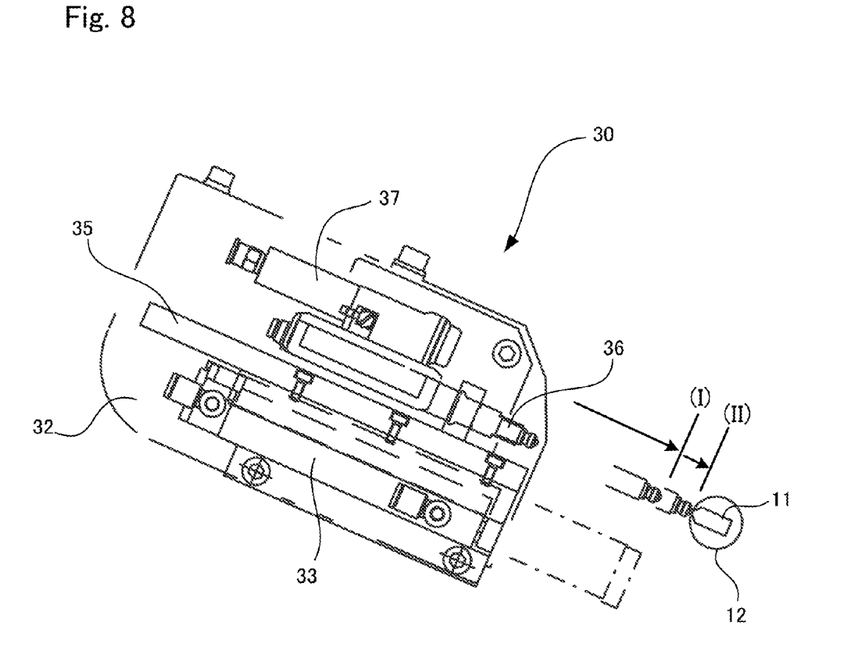
FIG. 8 is an enlarged front view of a detection unit.
Figure 9:
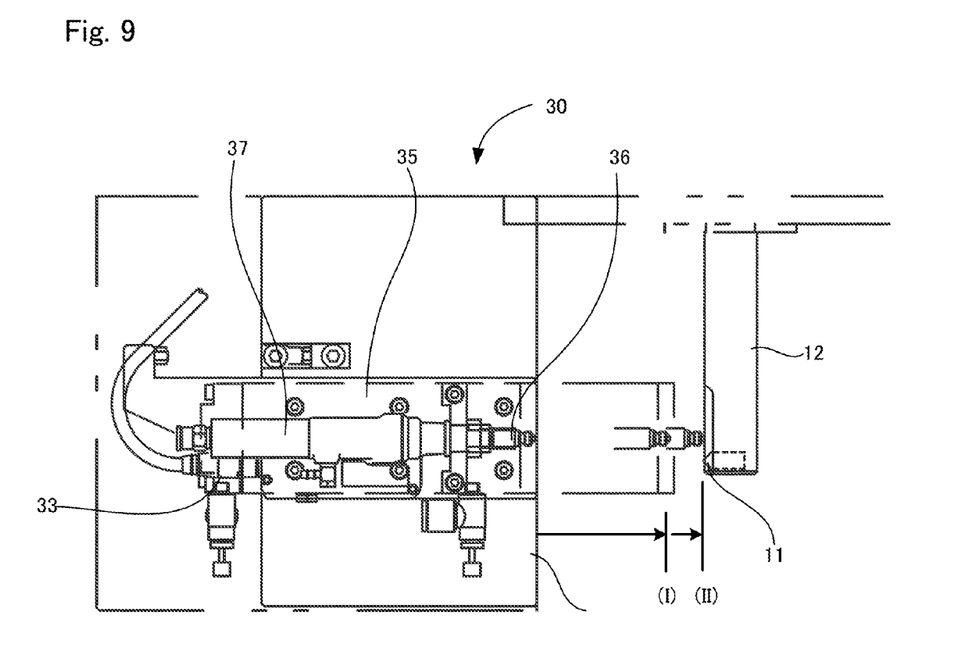
FIG. 9 is a plan view of FIG. 8.
Figure 10:
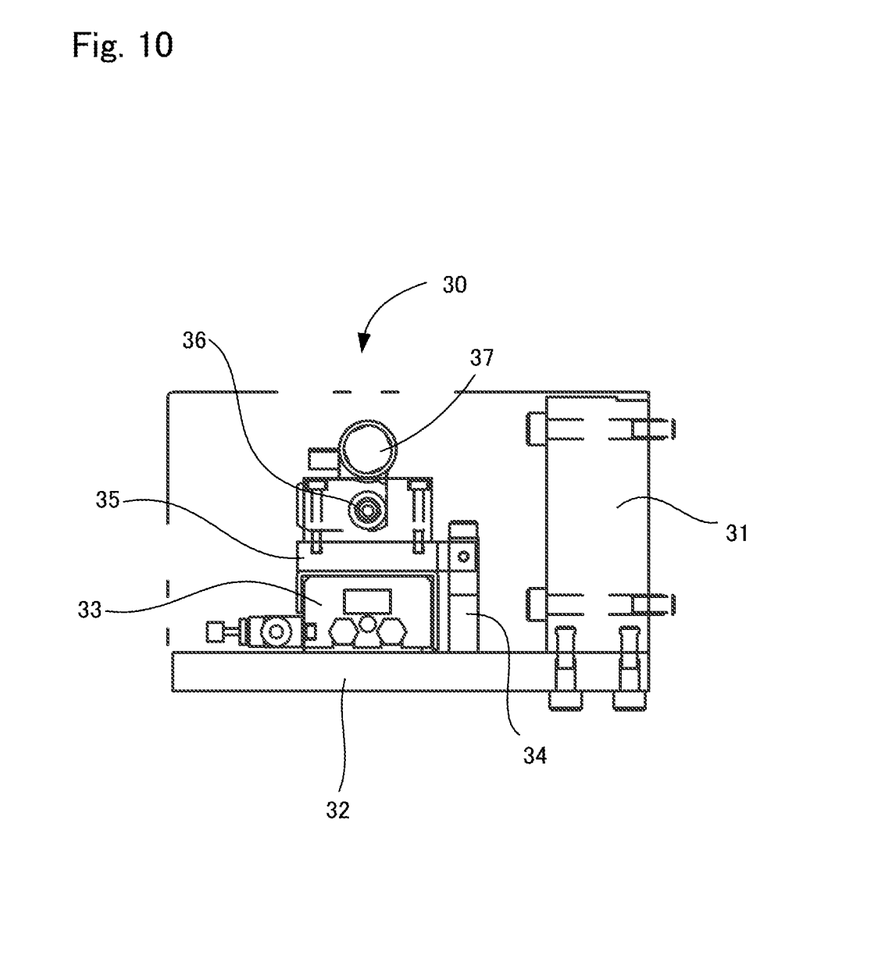
FIG. 10 is a side view of FIG. 8.

Hereinafter, the detection unit 30 will be described with reference also to FIG. 8 to FIG. 10. FIG. 8 is an enlarged front view of the detection unit. FIG. 9 is a plan view of FIG. 8. FIG. 10 is a side view of FIG. 8.

As shown in FIG. 7 and FIG. 8 to FIG. 10, the detection unit 30 is fixed to the distal end surface of the housing 21 via a rectangular bracket 31. The bracket 31 is arranged on the left side of the distal end surface of the housing 21 so as to face obliquely downward toward the spindle 12 of the tool holder 1. A first base 32 of the detection unit 30 is arranged in a lower end portion of the bracket 31. The first base 32 is in the form of a rectangular plate. A first air cylinder (fourth drive unit) 33 is arranged on the top of the first base 32. A guide rail 34 is arranged in a lateral part of the first air cylinder 33. The second base 35 is arranged to be movable linearly along the guide rail 34. The second base 35 is moved toward the spindle 12 of the tool holder 1 by the first air cylinder 33. A sensing unit 36 extending in the form of a bar and a second air cylinder (fifth drive unit) 37 configured to move the sensing unit 36 close to and away from the spindle 12 of the tool holder 1 are arranged on the second base 35. Further, the sensing unit 36 incorporates a contact sensor configured to sense the abutment against the spindle 12 and transmit it to the controller. The sensing unit 36 is oriented to a position along the inclination direction of the spindle 12 stopped at its original position.

The first and second air cylinders 33 and 37 provided in the detection unit 30 are driven and controlled by the aforementioned controller. In this regard, the driving of the first air cylinder 33 causes the second base 35 to move relative to the spindle 12, and the sensing unit 36 can be moved up to the position (I) shown in FIG. 8 and FIG. 9 that is close to the spindle 12. From this position (I), the second air cylinder 37 is driven, and the sensing unit 36 is moved to the position (II) to abut the spindle 12.

It should be noted that part of the controller that controls the rotational driving of the main shaft, the driving of the drive units, and the driving of the air cylinders, which will be described below, corresponds to a drive control unit of the present invention.

As described above, if the drawbar 7 is subjected to heat, there is a possibility that the drawbar 7 will undergo thermal deformation, thereby causing a loss of the original position of the tool 11, which may result in a decrease in machining accuracy.

Therefore, use of the aforementioned detection unit 30 makes it possible to detect how much the spindle 12 of the tool holder 1 is inclined from the axis X. Hereinafter, the operation thereof will be described. The sensing unit 36 is withdrawn to a position such that it does not interfere with machining during the machining. From this state, the first air cylinder 33 is first driven to move the second base 35 close to the spindle 12. This allows the distal end of the sensing unit 36 on the second base 35 to move to the position (I) shown in FIG. 8 and FIG. 9. Subsequently to this, the second air cylinder 37 is driven, and the sensing unit 36 is moved to the position (II) to abut the spindle 12. At this time, the sensing unit 36 preferably abuts a portion on the outer circumferential surface of the spindle 12 around the position where the tool 11 is attached, particularly, a portion around the proximal end portion of the tool 11. Thus, when the sensing unit 36 abuts a single point (first point) on the outer circumferential surface of the spindle 12 that is located at its original position, the controller stores the position of the sensing unit 36 at that time as a first abutting position (positional information).

Next, the second air cylinder 37 is driven, and the sensing unit 36 is moved away from the spindle 12 and backward to the position (I). Then, the main shaft motor 22 is driven, and the main shaft 2 is rotated 180 degrees. This causes the spindle 12 also to rotate 180 degrees about the axis X. At this time, the position (I) to which the sensing unit 36 is moved backward is a position where the sensing unit 36 does not interfere with the rotation of the spindle 12 and the tool 11. Subsequently to this, the second air cylinder 37 is driven, and the sensing unit 36 is moved again to abut a single point (second point) on the outer circumferential surface of the spindle 12. The controller stores the position of the sensing unit 36 at that time as a second abutting position (positional information).

Thereafter, the second air cylinder 37 and the first air cylinder 33 are driven in this order, and the abutting portion 36 is moved backward to the initial position. In the controller, the inclination of the spindle is calculated from the stored first and second positions. That is, if the first and second abutting positions coincide with each other, the spindle 12 has a circular cross section, which means that there is no inclination from the axis X. On the other hand, if there is a difference between the first and second abutting positions, the degree of inclination of the spindle 12 from the axis X can be calculated on the basis of the difference. Such calculation is performed in a calculation unit of the controller. When the degree of inclination of the spindle 12 is known, the controller drives the drive unit 8 on the basis of the degree of inclination, so as to move the drawbar 7 back and forth, thereby adjusting the inclination of the spindle 12 so that the axis X of the spindle 12 coincides with the axis Y of the workpiece.

Hereinbefore, embodiments of the present invention have been described. However, the present invention is not limited to the above described embodiments, and various modifications can be made without departing from the gist of the present invention.

In the above described embodiments, the inclination is achieved by forming the thin portion 447 in the tilting plate 44 of the tilting unit 4. However, deformable configurations other than such a thin portion may be employed as long as the inclination of the tilting plate 44 is achieved. Further, the tilting plate 44 may be of a shape other than a plate shape.

The tilting plate 44 and the coupling member 42 are coupled by the elastic plates 45 composed of a leaf spring. However, there is no particular limitation as long as they are coupled by an elastic member configured to deflect in the radial direction but not to deform in the axis direction, and an elastic member other than the elastic plates 45 may be used. Further, it is also possible to fix the tilting plate 44 and the coupling member 42 to each other integrally, without using an elastic member, as long as deformation between them is allowed.

The forms of the components shown in the above described embodiments are examples, and the forms are not particularly limited thereto as long as operation as a boring device described above is possible. For example, the coupling member is Y-shaped in side view, which is also an example. The form of the coupling member is not particularly limited as long as it is capable of allowing the drawing force from the drawbar to act on the tilting plate so as to cause the tilting plate to be inclined.

In the above described embodiments, the linear actuator 8 is used for moving the drawbar 7 back and forth. However, there is no limitation to this. For example, various means can be used such as a combination of an axial motor and a rotational/linear motion conversion mechanism (a ball screw and a nut).

Further, the boring device according to the present invention can be used not only for machining a pin hole of a piston as mentioned above, but also generally for boring to form a non-circular inner wall surface in addition to a common circular inner wall surface.

In the above described second embodiment, the detection unit is driven by the two air cylinders 33 and 37. However, there is no limitation to this. For example, a single air cylinder may be used for the abutting portion 36. In this case, the single air cylinder constitutes the third drive unit of the present invention. Further, drive means other than air cylinders, including various means such as a hydraulic device, a ball screw mechanism, and a motor can be used as long as it is possible to move the abutting portion close to and away from the spindle.

Further, in the above described second embodiment, the inclination of the spindle 12 is detected by allowing the sensing unit 36 to abut two points on the outer circumferential surface of the spindle 12. However, various methods other than this can be employed for calculating the inclination, such as a method in which the inclination is calculated by rotating the spindle 12 with the sensing unit 36 being abutted against the outer circumferential surface of the spindle 12.

In the above described second embodiment, a contact sensor is incorporated in the sensing unit 36. However, a non-contact sensor may be employed in the sensing unit 36. In this case, there is no need to bring the sensing unit 36 into contact with the spindle 12, as long as the distance between the sensing unit 36 and the outer circumferential surface of the spindle 12 can be measured. Laser, for example, can be used for the measurement. Using the distance as positional information, the inclination of the spindle can be calculated.

Further, there are various methods for acquiring positional information. For example, in the case of using a sensing unit of contact type, an absolute coordinate of the sensing unit 36 when it is in contact with the spindle 12, or a distance to which the pistons of the air cylinders 33 and 37 are extended, may be used. In short, it is sufficient that an absolute or relative position of the sensing unit 36 relative to the spindle 12 when the sensing unit 36 and the spindle 12 are in contact with each other is acquired. Also in the case of using a sensing unit of non-contact type, it is sufficient that a relative or absolute distance between the sensing unit 36 and the spindle 12 is measured, as in the above case.

The invention claimed is:

1. A boring device comprising:
   a hollow main shaft;
   a table supporting the main shaft rotatably about a predetermined axis;
   a tool holder having a spindle extending in the form of a bar, the tool holder being configured to rotate coaxially with the main shaft;
   a radially protruding tool provided at a distal end portion of the spindle of the tool holder;
   a tilting unit provided between the main shaft and the tool holder in the axis direction and configured to incline the tool holder from the axis;
   a drawbar configured to be movable back and forth in the axis direction within the main shaft;
   a first drive unit configured to rotate the main shaft about the axis; and
   a second drive unit configured to move the drawbar back and forth in the axis direction,
   wherein the tilting unit includes:
      a coupling member coupled to the drawbar, the coupling member having a fixing portion provided at a position away from the axis in the radial direction and a first abutting surface facing the main shaft side;
      a mounting base arranged between the coupling member and the main shaft so as to be fixed to the main shaft, the mounting base having a second abutting surface that is opposed to the first abutting surface of the coupling member via a gap of a predetermined length in the axis direction; and a tilting member coupled to the fixing portion of the coupling member, the tilting member having a deformable portion that is elastically deformable toward a side opposite to the fixing portion with respect to the axis, the tilting member being fixed to the mounting base at a position on an outer side of the deformable portion in the radial direction, and the tilting member supporting the tool holder, wherein the tilting member is configured to be inclined toward the main shaft side by deformation of the deformable portion.

2. The boring device according to claim 1, wherein the fixing portion of the coupling member and the tilting member are coupled to each other by an elastic member configured to deflect in the radial direction.

3. The boring device according to claim 1, wherein the coupling member includes:

a base coupled to the drawbar; and a first extending portion extending toward the tool holder side while being inclined outwardly in the radial direction from the base, the first extending portion having the fixing portion.

4. The boring device according to claim 3, wherein the coupling member further includes:

a second extending portion extending toward the tool holder side while being inclined toward a side opposite to the first extending portion in the radial direction, the second extending portion having the first abutting surface.

5. The boring device according to claim 1, wherein the second drive unit is composed of a linear actuator.

* * * * *